US010542340B2

(12) United States Patent
Perianu et al.

(10) Patent No.: US 10,542,340 B2
(45) Date of Patent: Jan. 21, 2020

(54) POWER MANAGEMENT FOR WIRELESS EARPIECES

(71) Applicant: BRAGI GmbH, München (DE)

(72) Inventors: Vlad Perianu, München (DE); Peter Vincent Boesen, München (DE)

(73) Assignee: BRAGI GmbH, München (DE)

( * ) Notice: Subject to any disclaimer, the term of this patent is extended or adjusted under 35 U.S.C. 154(b) by 125 days.

(21) Appl. No.: 15/360,624

(22) Filed: Nov. 23, 2016

(65) Prior Publication Data

US 2017/0155992 A1 Jun. 1, 2017

Related U.S. Application Data

(60) Provisional application No. 62/260,977, filed on Nov. 30, 2015.

(51) Int. Cl.
*H04R 1/10* (2006.01)
*H04R 29/00* (2006.01)

(52) U.S. Cl.
CPC ......... *H04R 1/1016* (2013.01); *H04R 1/1091* (2013.01); *H04R 29/001* (2013.01); *H04R 2420/07* (2013.01); *H04R 2460/03* (2013.01)

(58) Field of Classification Search
CPC .. H04R 1/1016; H04R 29/001; H04R 1/1091; H04R 2420/07; H04R 2460/03
See application file for complete search history.

(56) References Cited

U.S. PATENT DOCUMENTS

| | | |
|---|---|---|
| 3,934,100 A | 1/1976 | Harada |
| 4,150,262 A | 4/1979 | Ono |
| 4,334,315 A | 6/1982 | Ono et al. |
| 4,375,016 A | 2/1983 | Harada |
| 4,588,867 A | 5/1986 | Konomi |
| 4,654,883 A | 3/1987 | Iwata |
| 4,682,180 A | 7/1987 | Gans |
| 4,791,673 A | 12/1988 | Schreiber |
| 4,865,044 A | 9/1989 | Wallace et al. |
| 5,191,602 A | 3/1993 | Regen et al. |
| 5,201,007 A | 4/1993 | Ward et al. |
| 5,280,524 A | 1/1994 | Norris |

(Continued)

FOREIGN PATENT DOCUMENTS

| | | |
|---|---|---|
| EP | 1017252 A2 | 7/2000 |
| GB | 2074817 | 4/1981 |

(Continued)

OTHER PUBLICATIONS

Announcing the $3,333,333 Stretch Goal (Feb. 24, 2014).

(Continued)

*Primary Examiner* — Oyesola C Ojo

(74) *Attorney, Agent, or Firm* — Goodhue, Coleman & Owens, P.C.

(57) ABSTRACT

A system, method and wireless earpieces for managing power utilized by a pair of wireless earpieces. A signal strength is determined between the pair of wireless earpieces. Signal activity is determined for the pair of wireless earpieces. A low power mode is activated in response to determining the signal activity is below an activity threshold. The low power mode is activated for the one or more of the pair of wireless earpieces in response to the signal strength exceeding one or more signals thresholds.

19 Claims, 4 Drawing Sheets

(56) References Cited

U.S. PATENT DOCUMENTS

| | | |
|---|---|---|
| 5,295,193 A | 3/1994 | Ono |
| 5,298,692 A | 3/1994 | Ikeda et al. |
| 5,343,532 A | 8/1994 | Shugart |
| 5,363,444 A | 11/1994 | Norris |
| 5,497,339 A | 3/1996 | Bernard |
| 5,606,621 A | 2/1997 | Reiter et al. |
| 5,613,222 A | 3/1997 | Guenther |
| 5,692,059 A | 11/1997 | Kruger |
| 5,721,783 A | 2/1998 | Anderson |
| 5,749,072 A | 5/1998 | Mazurkiewicz et al. |
| 5,771,438 A | 6/1998 | Palermo et al. |
| 5,802,167 A | 9/1998 | Hong |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,230,029 B1 | 5/2001 | Yegiazaryan et al. |
| 6,275,789 B1 | 8/2001 | Moser et al. |
| 6,339,754 B1 | 1/2002 | Flanagan et al. |
| 6,408,081 B1 | 6/2002 | Boesen |
| 6,424,820 B1 * | 7/2002 | Burdick .............. H04B 5/0081 455/132 |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,654,721 B2 | 11/2003 | Handelman |
| 6,664,713 B2 | 12/2003 | Boesen |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| 7,463,902 B2 | 12/2008 | Boesen |
| 7,508,411 B2 | 3/2009 | Boesen |
| 7,979,035 B2 | 7/2011 | Griffin et al. |
| 7,983,628 B2 | 7/2011 | Boesen |
| 8,095,188 B2 | 1/2012 | Shi |
| 8,140,357 B1 | 3/2012 | Boesen |
| 8,243,946 B2 * | 8/2012 | Burge .............. H04R 1/1041 381/74 |
| 8,300,864 B2 | 10/2012 | Johansen |
| 8,436,780 B2 | 5/2013 | Schantz et al. |
| 8,719,877 B2 | 5/2014 | VonDoenhoff et al. |
| 8,831,242 B2 * | 9/2014 | Brown .............. H03G 3/20 381/74 |
| 9,635,476 B2 * | 4/2017 | Han .............. H04R 25/554 |
| 2001/0005197 A1 | 6/2001 | Mishra et al. |
| 2001/0027121 A1 | 10/2001 | Boesen |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0160511 A1 | 8/2004 | Boesen |
| 2005/0043056 A1 | 2/2005 | Boesen |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2006/0029246 A1 | 2/2006 | Boesen |
| 2006/0074671 A1 | 4/2006 | Farmaner et al. |
| 2006/0074808 A1 | 4/2006 | Boesen |
| 2008/0254780 A1 | 10/2008 | Kuhl et al. |
| 2009/0003641 A1 * | 1/2009 | Van Der Bilt ....... H04R 1/1041 381/374 |
| 2009/0052707 A1 * | 2/2009 | Hain .............. H04R 25/43 381/315 |
| 2009/0087005 A1 * | 4/2009 | Reithinger ........... H04R 25/552 381/317 |
| 2009/0197532 A1 * | 8/2009 | Wyper ............... H04M 1/6066 455/41.2 |
| 2011/0286615 A1 * | 11/2011 | Olodort ............... H04R 1/1025 381/311 |
| 2013/0078981 A1 * | 3/2013 | Emery .................. H04M 1/605 455/418 |
| 2013/0121494 A1 * | 5/2013 | Johnston ............. H04R 1/1041 381/56 |
| 2013/0316642 A1 * | 11/2013 | Newham ........... H04W 52/0206 455/11.1 |
| 2014/0003636 A1 * | 1/2014 | Bodvarsson ......... H04R 25/552 381/311 |
| 2014/0146976 A1 * | 5/2014 | Rundle ................ H04R 1/1083 381/71.6 |
| 2014/0233752 A1 * | 8/2014 | Seo ........................ H04M 1/035 381/74 |
| 2014/0321682 A1 * | 10/2014 | Kofod-Hansen .... H04R 25/305 381/315 |
| 2015/0043762 A1 * | 2/2015 | Kim ...................... H04R 25/558 381/315 |
| 2015/0163748 A1 * | 6/2015 | Hrabak ............ H04W 52/0245 455/41.2 |
| 2017/0013345 A1 * | 1/2017 | Kumar ............... G10K 11/1788 |
| 2017/0127194 A1 * | 5/2017 | Neumeyer ............. H04R 25/50 |
| 2017/0144042 A1 * | 5/2017 | Kanda ................... A63B 69/00 |
| 2017/0280256 A1 * | 9/2017 | Pedersen ............. H04R 25/552 |

FOREIGN PATENT DOCUMENTS

| | | |
|---|---|---|
| JP | 06292195 | 10/1998 |
| WO | 2014043179 A2 | 3/2014 |
| WO | 2015110577 A1 | 7/2015 |
| WO | 2015110587 A1 | 7/2015 |

OTHER PUBLICATIONS

BRAGI Is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, A Lot to Be Done Over Christmas (Dec. 22, 2014).

(56) References Cited

OTHER PUBLICATIONS

BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People @BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing—Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, On Track(May 16, 2015).
BRAGI Update—Beta2 Production and Factory Line(Aug. 20, 2015).
BRAGI Update—Certifications, Production, Ramping Up (Nov. 13, 2015).
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2014).
BRAGI Update—On Track, Design Verification, How It Works and What's Next(Jul. 15, 2015).
BRAGI Update—On Track, On Track and Gems Overview (Jun. 24, 2015).
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Last Push Before the Kickstarter Campaign Ends on Monday 4pm CET (Mar. 28, 2014).
Staab, Wayne J., et al., "A One-Size Disposable Hearing Aid is Introduced", The Hearing Journal 53(4):36-41) Apr. 2000.
Stretchgoal—Its Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).
International Search Report & Written Opinion, PCT/EP2016/079222 (dated Feb. 17, 2017).

\* cited by examiner

POWER MANAGEMENT FOR WIRELESS EARPIECES

RELATED APPLICATIONS

This application claims priority to U.S. Provisional Patent Application No. 62/260,977, filed Nov. 30, 2015 entitled, "Positional Location Based on Signal Strength Device and Method", hereby incorporated by reference in its entirety.

BACKGROUND

I. Field of the Disclosure

The illustrative embodiments relate to wireless earpieces. More specifically, but not exclusively, the illustrative embodiments relate to managing power settings for wireless earpieces utilizing signal strength between a pair of wireless earpieces and signal activity.

II. Description of the Art

The growth of wearable devices is increasing exponentially. This growth is fostered by the decreasing size of microprocessors, circuitry boards, chips, and other components. Wearable devices are necessarily dependent upon their batteries in order to complete their desired function. The overall utility of wearable devices is directly proportional to the battery life of the devices. If the battery life is poor, the user interface and user experiences suffers as too much time and attention are required for retrieving the device, recharging or replacing the battery, and repositioning the wearable device. Operation and conservation of the battery life of the wearable device may be further complicated if the user forgets to turn the wireless earpieces off when removed or when inactive.

SUMMARY OF THE DISCLOSURE

One embodiment of the illustrative embodiments provides a system, method and wireless earpieces for managing power utilized by a pair of wireless earpieces. A signal strength is determined between the pair of wireless earpieces. Signal activity is determined for the pair of wireless earpieces. A low power mode is activated in response to determining the signal activity is below an activity threshold. The low power mode is activated for the one or more of the pair of wireless earpieces in response to the signal strength exceeding one or more signals thresholds. Another embodiment provides wireless earpieces including a processor and a memory storing a set of instructions. The set of instructions are executed to perform the method described.

Another embodiment provides a wireless earpiece. The wireless earpiece includes a frame for fitting in an ear of a user. The wireless earpiece includes a logic engine controlling functionality of the wireless earpiece. The wireless earpiece includes a number of sensors receiving biometric information from the user. The wireless earpieces includes a transceiver communicating with at least a wireless device. The logic determines a signal strength between a pair of wireless earpieces, determines signal activity for the pair of wireless earpieces, activates a low power mode in response to determining the signal activity is below an activity threshold, and activates the low power mode for one or more of the pair of wireless earpieces in response to the signal strength exceeding one or more signal thresholds.

BRIEF DESCRIPTION OF THE DRAWINGS

Illustrated embodiments of the present invention are described in detail below with reference to the attached drawing figures, which are incorporated by reference herein, and where.

DETAILED DESCRIPTION OF THE DISCLOSURE

The illustrative embodiments provide a system, method, and devices for managing power utilization of wireless earpieces. The wireless earpieces may utilize the low power mode to preserve battery life. As a result, the power capacity of the wireless earpieces may be reserved for full utilization when needed by the user. Preserving the battery life or power available is particularly important because of the reduced size of the wireless earpieces and limited available space for the battery. In addition, the wireless earpieces may become particularly important to a user for business, exercise, or personal activities and, therefore, merit preserving power whenever possible to optimize the user's experience.

Any number of conditions, factors, and so forth may be utilized to determine whether the wireless earpieces should enter a low power, sleep, hibernation, or other reduced power mode, status, or configuration. In one embodiment, the 1) signal activity of one or both of the wireless earpieces and/or 2) signal strength or proximity of the pair of wireless earpieces and/or other interconnected devices may be utilized to determine whether a low power mode should be activated.

In one embodiment, the signal activity between a matched pair of wireless earpieces may be utilized to determine whether the wireless earpieces should be placed in a low power mode. In one embodiment, the wireless earpieces may enter a low power mode in response to a lack of activity (e.g., playing music, selection for blocking noise, communicating voice signals for communication, etc.). In one embodiment, the wireless earpieces may enter a low power mode jointly. For example, if signal activity or other activity for the wireless earpieces is not determined or detected for a predetermined time period, such as three minutes, both of the wireless earpieces may enter a low power mode. Alternatively, if one wireless earpiece enters a low power mode, a command may be sent to the other wireless earpiece, if in range, to also enter the low power mode. The determinations of signal activity may also be made by individual wireless earpieces in the event that they are being utilized alone rather than as a pair.

The wireless earpieces may also utilize the signal strength or determined distance between the pair of wireless earpieces (or between the wireless earpieces and another computing or communications device). In one embodiment, if the wireless earpieces are determined to be too close together (e.g., set next to each other on a surface, positioned in a smart case, etc.) or too far apart (e.g., separated by more than 1-5 feet) the wireless earpieces alone or collectively may enter the low power mode. As a result, the wireless earpieces may preserve power of the battery or other power source for subsequent use by the user.

Figure 1:
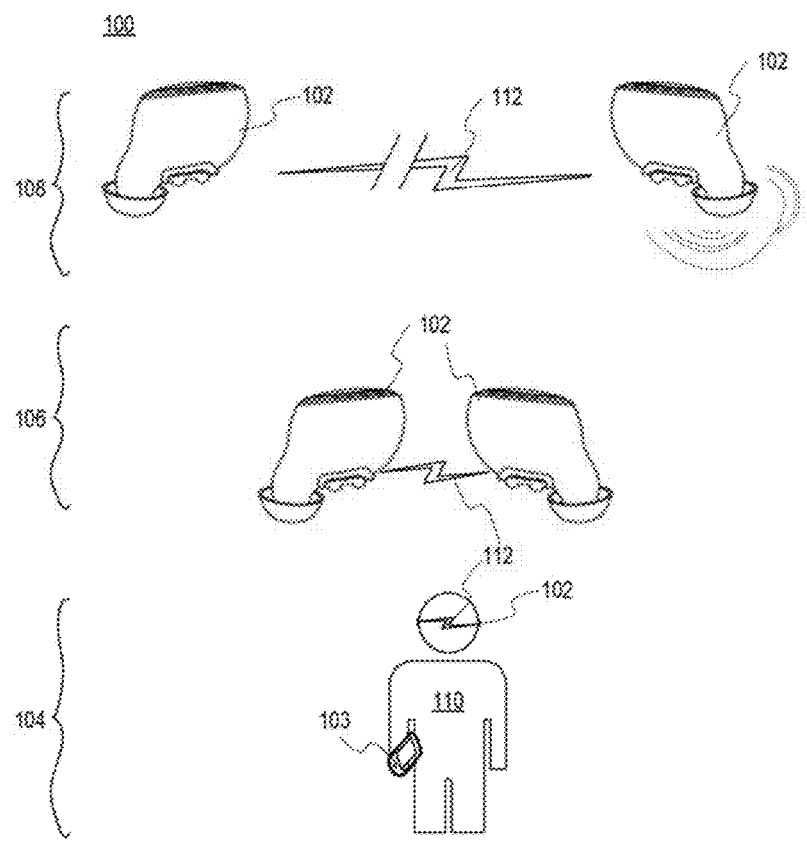
FIG. 1 is a pictorial representation of a wireless environment in accordance with an illustrative embodiment.

FIG. 1 is a pictorial representation of a wireless environment 100 in accordance with an illustrative embodiment. The wireless earpieces 102 may be configured to communicate with each other and with one or more wireless devices, such as a wireless device 103. The wireless earpieces 102 are shown both as worn by the user 110 and separately from their positioning within the ears of the user 110 for purposes of visualization.

In one embodiment, the wireless earpieces 102 include a frame shaped to fit substantially within the ear of the user 110. The frame is a support structure that at least partially encloses and houses the electronic components of the wireless earpieces 102. The frame may include one or more sleeves configured to fit the inside of the ear of the user 110. The sleeves may have extremely tight tolerances to fit the user 110 and one or more other users that may utilize the wireless earpieces during their expected lifecycle. In another embodiment, the sleeves may be custom built. In some applications, temporary adhesives or securing mechanisms (e.g., clamps, straps, extenders, etc.) may be utilized to ensure that the wireless earpieces 102 remain in the ears of the user 110 even during the most rigorous and physical activities. For example, the wireless earpieces 102 may be utilized during water polo matches, football games, triathlons, or soccer matches. The wireless earpieces 102 may be configured to play music or audio, receive and make phone calls or other communications, determine ambient environmental conditions (e.g., temperature, altitude, location, speed, heading, etc.), read user biometrics (e.g., heart rate, motion, temperature, sleep, blood oxygenation, voice output, calories burned, forces experienced, etc.), and receive user input, feedback, or instructions.

In one embodiment, the wireless environment illustrates wireless earpieces 102 shown in three different positions, position one 104, position two 106, and position three 108. The three different positions represent distinct distances between the wireless earpieces 102. Although not shown to scale, in position one 104, the wireless earpieces 102 are being worn by a user 110 by being partially inserted into the user's ears. Position one 104 may also be referred to as an in-use or worn position for the wireless earpieces 102.

In position two 106, the wireless earpieces 102 are placed adjacent to each other either in a free standing or set position or within a cradled position that may correspond to receptacles of a smart case of the wireless earpieces 102. Position two 106 may also be referred to as a close position in which the wireless earpieces 102 are not in use because of their close proximity to each other.

In position three 108, the wireless earpieces 102 are separated by a significant distance such that the wireless earpieces 102 are unable m communicate with one another. Position three 108 may also be referred to as a separated or far position in which the wireless earpieces 102 are unable to communicate with each other. Position three may occur in response to only one of the wireless earpieces being worn, one of the wireless earpieces being lost, or any number of situations and scenarios.

The wireless earpieces 102 may determine their position with respect to each other as well as the wireless device 103. For example, position information for the wireless earpieces 102 and the wireless device 103 may determine proximity of the devices.

Signal activity or utilization of the wireless earpieces 102 may also be determined. The signal activity may determine whether the wireless earpieces 102 are being actively utilized by the user 110. For example, are the wireless earpieces 102 being utilized to play music, actively perform communications, receive voice commands, provide guidance, perform noise cancellation, or other functions of the wireless earpieces 102. If the wireless earpieces 102 are being actively utilized, their status may be confirmed as "active,".

If the wireless earpieces 102 are not actively being utilized, their status may be confirmed as "inactive,". In one example, status or heat beat communications or pings between the wireless earpieces 102 or between the wireless earpieces 102 and the wireless device 103 are not considered in determining the status of the wireless earpieces.

The power status of the wireless earpieces 102 may be adjusted in response to the positions of the wireless earpieces 102 with respect to each other, proximity between the wireless earpieces 102 and the wireless device 102, and based on the signal activity of the wireless earpieces 102.

In one embodiment, the wireless earpieces 102 may be configured to take a number of measurements when in position one 104 to determine baseline/default readings regarding signal strength and proximity. In one embodiment, the wireless earpieces 102 may take readings for each of one or more users 110 that utilize the wireless earpieces 102 in response to confirmed usage of the wireless earpieces 102. For example, confirmed usage may include detecting a heartbeat, active participation in a conversation, listening to music, or so forth. The signal strength readings may be similarly determined for the wireless earpieces 102 when placed next to each other or in the smart case of the wireless earpieces 102. As a result, the wireless earpieces 102 may establish any number of thresholds for determining where the wireless earpieces may be categorized as in position one 104, position two 106, and position three 108.

As part of the training process for utilizing the wireless earpieces 102, the user may be prompted to place the wireless earpieces 102 in various positions with respect to each other, the user 110, and the wireless device 103 for subsequent determinations of signal strength, distance or proximity, and so forth. In one embodiment, the training process may be implemented by an application for the wireless earpieces 103 running on the wireless device 103 or other electronics controlled by the user 110. The wireless earpieces 102 may utilize historical information to generate thresholds, policies, or settings for determining the proximity of the wireless earpieces 102 to one another.

In one embodiment, the wireless earpieces 102 may be part of a personal area network. The wireless earpieces 102 may be utilized to control, communicate, manage, or interact with a number of other wearable devices, such as smart glasses, helmets, smart glass, watches or wrist bands, other wireless earpieces, chest straps, implants, displays, clothing, or so forth. A personal area network is a network for data transmissions among devices, such as personal computing, communications, camera, vehicles, entertainment, and medical devices. The personal area network may utilize any number of wired, wireless, or hybrid configurations and may be stationary or dynamic. For example, the personal area network may utilize wireless network protocols or standards, such as INSTEON, IrDA, Wireless USB, Bluetooth, Z-Wave, ZigBee, Wi-Fi, ANT+ or other applicable radio frequency signals. In one embodiment, the personal area network may move with the user.

The wireless earpieces 102 may include any number of sensors for receiving user biometrics, such as pulse rate, blood oxygenation, temperature, calories expended, voice and audio output, and orientation (e.g., body, head, etc.). The sensors may also determine the user's location, position, velocity, impact levels, and so forth. The sensors may also receive user input and convert the user input into commands or selections made across the personal devices of the personal area network. For example, the user input detected by the wireless earpieces may include voice commands, head motions, linger taps, finger swipes, motions or gestures, or other user inputs sensed by the wireless earpieces. The user input may be determined by the wireless earpieces 102 and converted into commands that may be sent to one or more external devices, such as the wireless device 103 a tablet computer, or so forth.

In other embodiments, the wireless environment 100 may include any number of devices, components, or so forth that may communicate with each other directly or indirectly through a wireless (or wired) connection, signal, or link, such as the wireless signals 112. The wireless environment 100 may include one or more networks and network components and devices, such as routers, servers, signal extenders, intelligent network devices, computing devices, or so forth. In one embodiment, the network of the wireless environment 100 represents a personal area network as previously disclosed. Communications, such as the wireless signals 112, within the wireless environment 100 may occur through the network or may occur directly between devices, such as the wireless earpieces 102 and the wireless device 103 (e.g., direct communication of the wireless signal 1112) or between the wireless earpieces 102 and the wireless device 103 (indirect communication through a Wi-Fi network utilizing the wireless signal 112). In one embodiment, the wireless environment 100 may communicate with or include a wireless network, such as a Wi-Fi, cellular (e.g., 3G, 4G, 5G, PCS, GSM, etc.). Bluetooth, or other radio frequency network. The wireless environment 100 may also communicate with any number of hard wired networks, such as local area networks, coaxial networks, fiber-optic networks, or so forth. Communications within the wireless environment 100 may be operated by one or more users, service providers, or network providers.

The wireless earpieces 102 may play utilize any number of alerts or communications to indicate that the wireless earpieces 102 are entering a low power mode. For example, an alert may be played audibly to the user 110. For example, the user 112 may be played an alert indicating "the wireless earpieces are entering a low power mode, say something now or provide feedback to keep them active". The wireless earpieces 102 may also vibrate, flash, play a tone or other sound, or give other indications to the user 110 that the wireless earpieces 102 are a entering a low power mode. The wireless earpieces 102 may also communicate an alert to the wireless device 103 that shows up as a notification, message, or other indicator indicating the changed status of the wireless earpieces 102.

The wireless earpieces 102 as well as the wireless device 103 may include logic for automatically implementing a low power mode in response to various conditions and factors of the wireless environment 100. As a result, the wireless earpieces 102 may be adapted to preserve battery life for when it is most needed.

In one embodiment, the wireless device 103 may utilize short-range or long-range wireless communications to communicate with the wireless earpieces 102 through the wireless signal 112 or devices of the wireless environment. For example, the wireless device 103 may include a Bluetooth and cellular transceiver within the embedded logical components. For example, the wireless signal 112 may be a Bluetooth, Zigbee, Ant+, or other short range wireless communication.

The wireless device 103 may represent any number of wireless or wired electronic communications or computing devices, such as smart phones, laptops, desktop computers, control systems, tablets, displays, gaming devices, music players, personal digital assistants, vehicle systems, or so forth. The wireless device 103 may communicate utilizing any number of wireless connections, standards, or protocols (e.g., near field communications, Bluetooth, wireless Ethernet, etc.). For example, the wireless device 103 may be a touch screen cellular phone that communicates with the wireless earpieces 102 utilizing Bluetooth communications. The wireless device 103 may implement and utilize any number of operating systems, kernels, instructions, or applications that may make use of the proximity, sensor, or activity data or user input received from the wireless earpieces 102. For example, the wireless device 103 may represent any number of android, iOS, Windows, open platforms, or other systems. Similarly, the wireless device 103 or the wireless earpieces 102 may include a number of applications that utilize the user input, proximity data, biometric data, and other feedback from the wireless earpieces 102 to display applicable information and data, control the applications, play audible or tactile alerts, or make other selections.

Figure 2:
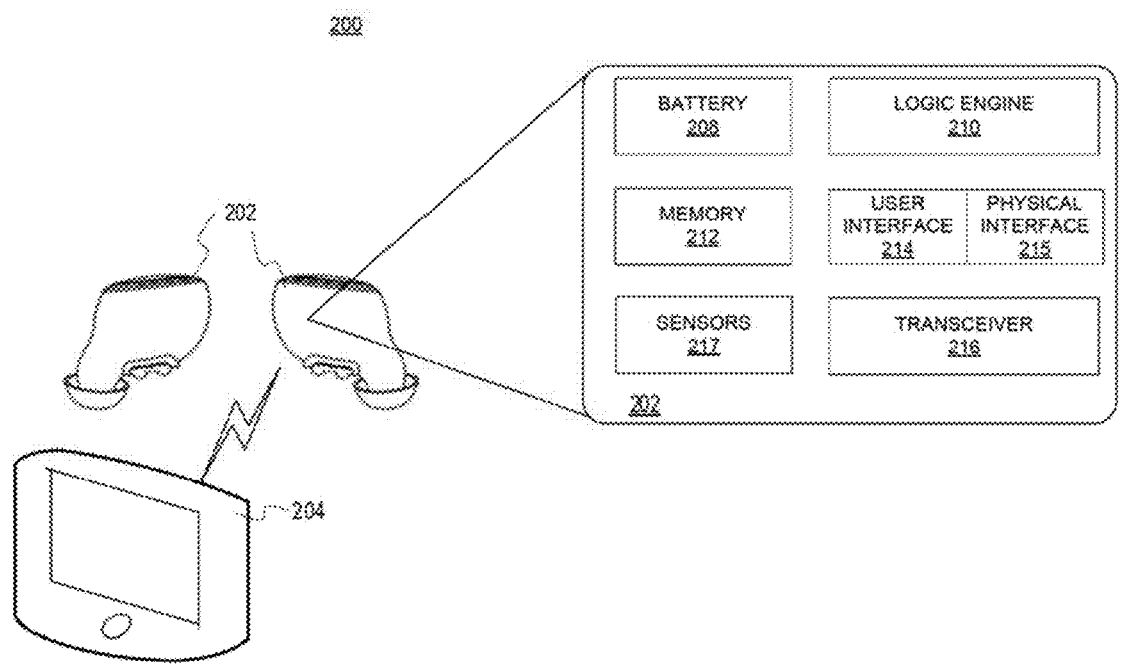
FIG. 2 is a block diagram of wireless earpieces in accordance with an illustrative embodiment.

FIG. 2 is a block diagram of a wireless earpiece system 200 in accordance with an illustrative embodiment. In one embodiment, the wireless earpiece system 200 may include wireless earpieces 202 (described collectively rather than individually). In one embodiment, the wireless earpiece system 200 may enhance communications and functionality of the wireless earpieces 202.

As shown, the wireless earpieces 202 may be wirelessly linked to a computing device 204. For example, the computing device 204 may represent a wireless tablet computer, mobile phone, or other computing device. User input and commands may be received from either the wireless earpieces 202 or the computing device 204 for implementation on either of the devices of the wireless earpiece system 200 (or other externally connected devices). As previously noted, the wireless earpieces 202 may be referred to or described herein as a pair (wireless earpieces) or singularly (wireless earpiece). The description may also refer to components and functionality of each of the wireless earpieces 202 collectively or individually.

In some embodiments, the computing device 204 may act as a logging tool for receiving information, data, or measurements made by the wireless earpieces 202. For example, the computing device 204 may download data from the wireless earpieces 202 in real-time. As a result, the computing device 204 may be utilized to store, display, and synchronize data for the wireless earpieces 202. For example, the computing device 204 may display pulse, proximity, location, oxygenation, distance, calories burned, and so forth as measured by the wireless earpieces 202. The computing device 204 may be configured to receive and display alerts that indicate conditions to enter a low power mode have been met. For example, if the wireless devices 202 meet a distance threshold between devices, and there is not significant signal activity, the wireless earpieces 202 may enter the low power mode and generate a message to the computing device 204 indicating the wireless earpieces 202 have entered the low power mode. The wireless earpieces 202 and the computing device 204 may have any number of electrical configurations, shapes, and colors and may include various circuitry, connections, and other components.

In one embodiment, the wireless earpieces 202 may include a battery 208, a logic engine 210, a memory 212, a user interface 214, a physical interface 215, a transceiver 216, and sensors 217. The computing device 204 may have any number of configurations and include components and features as are known in the art.

The battery 208 is a power storage device configured to power the wireless earpieces 202. Likewise, the battery 218 is a power storage device configured to power the computing device 204. In other embodiments, the battery 208 may represent a fuel cell, thermal electric generator, piezo electric charger, solar charger, ultra-capacitor, or other existing or developing power storage technologies. The illustrative embodiments preserve the capacity of the battery 208 by reducing unnecessary utilization of the wireless earpieces 202 in a full-power mode when there is little or no benefit to the user (e.g., the wireless earpieces 202 are sitting on a table or temporarily lost).

The logic engine 210 is the logic that controls the operation and functionality of the wireless earpieces 202. The logic engine 210 may include circuitry, chips, and other digital logic. The logic engine 210 may also include programs, scripts, and instructions that may be implemented to operate the logic engine 210. The logic engine 210 may represent hardware, software, firmware, or any combination thereof. In one embodiment, the logic engine 210 may include one or more processors. The logic engine 210 may also represent an application specific integrated circuit (ASIC) or field programmable gate array (FPGA). The logic engine 210 may utilize the signal strength sensed by the transceiver 216 to determine the proximity of the wireless earpieces 202 to each other as well as the computing device 204. The logic engine 210 may also determine whether the wireless earpieces 202 are actively performing any user-requested functions that indicate the wireless earpieces 202 are active. For example, the logic engine may determine whether music is being played, communications being received, processed, or sent, noise-cancellation is being performed and so forth. Utilizing the proximity information and signal activity, the logic engine 210 may provide instructions to enter a low power mode. In one embodiment, the logic engine 210 may turn off or reduce power to most of the components of the wireless earpieces. For example, the logic engine 210 may completely power down the wireless earpieces 202 requiring the user to turn the wireless earpieces 202 back on. In another example, the logic engine 210 may turn off power to most of the components except for a small portion of the user interface 214 and transceiver that may periodically determine whether user feedback or communications are received. If user feedback or communications are detected or received, the logic engine 210 may wake up or power up the wireless earpieces 202 from the low power mode to a regular or full-power mode. The wireless earpieces 202 may be configured to work together or completely independently based on the needs of the user.

The logic engine 210 may also process user input to determine commands implemented by the wireless earpieces 202 or sent to the wireless earpieces 204 through the transceiver 216. Specific actions may be associated with proximity thresholds. For example, the logic engine 210 may implement a macro allowing the user to associate proximity data with specific modes of operation, such as normal operations for when the wireless earpieces 202 are positioned within the ears of the user, recharge or low power mode when the wireless earpieces are not being worn by the user and are close together (e.g., closer than when worn in the ears of the user) in the smart case, low power mode if the wireless earpieces 202 are not being worn and close together, and low power mode if the wireless earpieces 202 are separated by a significant distance (e.g., much greater than when worn in the ears of the user) or unable to communicate with one another, and inactive.

In one embodiment, a processor included in the logic engine 210 is circuitry or logic enabled to control execution of a set of instructions. The processor may be one or more microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks.

The memory 212 is a hardware element, device, or recording media configured to store data or instructions for subsequent retrieval or access at a later time. The memory 212 may represent static or dynamic memory. The memory 212 may include a hard disk, random access memory, cache, removable media drive, mass storage, or configuration suitable as storage for data, instructions, and information. In one embodiment, the memory 212 and the logic engine 210 may be integrated. The memory may use any type of volatile or non-volatile storage techniques and mediums. The memory 212 may store information related to the status of a user, wireless earpieces 202, computing device 204, and other peripherals, such as a wireless device, smart glasses, smart watch, smart case for the wireless earpieces 202, wearable device, and so forth. In one embodiment, the memory 212 may display instructions, programs, drivers, or an operating system for controlling the user interface 214 including one or more LEDs or other light emitting components, speakers, tactile generators (e.g., vibrator), and so forth. The memory 212 may also store thresholds, conditions, signal or processing activity, proximity data, and so forth.

The transceiver 216 is a component comprising both a transmitter and receiver which may be combined and share common circuitry on a single housing. The transceiver 216 may communicate utilizing Bluetooth, Wi-Fi, ZigBee, Ant+, near field communications, wireless USB, infrared, mobile body area networks, ultra-wideband communications, cellular (e.g., 3G, 4G, 5G, PCS, GSM, etc.), infrared, or other suitable radio frequency standards, networks, protocols, or communications. The transceiver 216 may also be a hybrid transceiver that supports a number of different communications. For example, the transceiver 216 may communicate with the computing device 204 or other systems utilizing wired interfaces (e.g., wires, traces, etc.), NFC or Bluetooth communications. The transceiver 216 may also detect amplitudes and infer distance between the wireless earpieces 202. The transceiver 216 may also detect amplitudes for determining the distance to the computing device 204.

The components of the wireless earpieces 202 may be electrically connected utilizing any number of wires, contact points, leads, busses, wireless interfaces, or so forth. In addition, the wireless earpieces 202 may include any number of computing and communications components, devices or elements which may include busses, motherboards, circuits, chips, sensors, ports, interfaces, cards, converters, adapters, connections, transceivers, displays, antennas, and other similar components. The physical interface 215 is hardware interface of the wireless earpieces 202 for connecting and communicating with the computing device 204 or other electrical components, devices, or systems.

The physical interface 215 may include any number of pins, arms, or connectors for electrically interfacing with the contacts or other interface components of external devices or other charging or synchronization devices. For example, the physical interface 215 may be a micro USB port. In one embodiment, the physical interface 215 is a magnetic interface that automatically couples to contacts or an interface of the computing device 204. In another embodiment, the physical interface 215 may include a wireless inductor for charging the wireless earpieces 202 without a physical connection to a charging device.

The user interface 214 is a hardware interface for receiving commands, instructions, or input through the touch (haptics) of the user, voice commands, or predefined motions. The user interface 214 may be utilized to control the other functions of the wireless earpieces 202. The user interface 214 may include the LED array, one or more touch sensitive buttons or portions, a miniature screen or display, or other input/output components. The user interface 214 may be controlled by the user or based on commands received from the computing device 204 or a linked wireless device. For example, the user may turn on, reactivate, or provide feedback utilizing the user interface 214.

In one embodiment, the user may provide feedback by tapping the user interface 214 once, twice, three times, or any number of times. Similarly, a swiping motion may be utilized across or in front of the user interface 214 (e.g., the exterior surface of the wireless earpieces 202) to implement a predefined action. Swiping motions in any number of directions or gestures may be associated with specific activities, such as play music, pause, fast forward, rewind, activate a digital assistant (e.g., Siri, Cortana, smart assistant, etc.). The swiping motions may also be utilized to control actions and functionality of the computing device 204 or other external devices (e.g., smart television, camera array, smart watch, etc.). The user may also provide user input by moving his head in a particular direction or motion or based on the user's position or location. For example, the user may utilize voice commands, head gestures, or touch commands to change the content displayed by the computing device 204. The user interface 214 may also provide a software interface including any number of icons, soft buttons, windows, links, graphical display elements, and so forth.

The sensors 217 may include pulse oximeters, accelerometers, gyroscopes, magnetometers, inertial sensors, photo detectors, miniature cameras, and other similar instruments for detecting location, utilization, orientation, motion, and so forth. The sensors 217 may also be utilized to determine whether the wireless earpieces 202 are being actively utilized. The sensors 217 may provide measurements or data that may be utilized to select, activate, or enter a low power mode. For example, the biosensors within the sensors 217 may determine whether the wireless earpieces 202 are in use and may be utilized as part of the signal activity.

The computing device 204 may include components similar in structure and functionality to those shown for the wireless earpieces 202. The computing device may include any number of processors, batteries, memories, busses, motherboards, chips, transceivers, peripherals, sensors, displays, cards, ports, adapters, interconnects, and so forth. In one embodiment, the computing device 204 may include one or more processors and memories for storing instructions. The instructions may be executed as part of an operating system, application, browser, or so forth to implement the features herein described. In one embodiment, the wireless earpieces 202 may be magnetically or physically coupled to the computing device 204 to be recharged or synchronized or to be stored.

The computing device 204 may also execute an application with settings or conditions for entering a low power mode and full power mode. The user may adjust and program the settings including thresholds, activities, conditions, environmental factors, and so forth.

In another embodiment, the computing device 204 may also include sensors for detecting the location, orientation, and proximity of the wireless earpieces 202 to the computing device 204. The wireless earpieces 202 may turn off communications to the computing device 204 in response to losing a status or heart beat connection to preserve battery life and may only periodically search for a connection, link, or signal to the computing device 204.

As originally packaged, the wireless earpieces 202 and the computing device 204 may include peripheral devices such as charging cords, power adapters, inductive charging adapters, solar cells, batteries, lanyards, additional light arrays, speakers, smart case covers, transceivers (e.g., Wi-Fi, cellular, etc.), or so forth. In one embodiment, the wireless earpieces 202 may include a smart case (not shown). The smart case may include an interface for charging the wireless earpieces 202 from an internal battery. The smart case may also utilize the interface or a wireless transceiver to log utilization, biometric information of the user, and other information and data.

Figure 3:
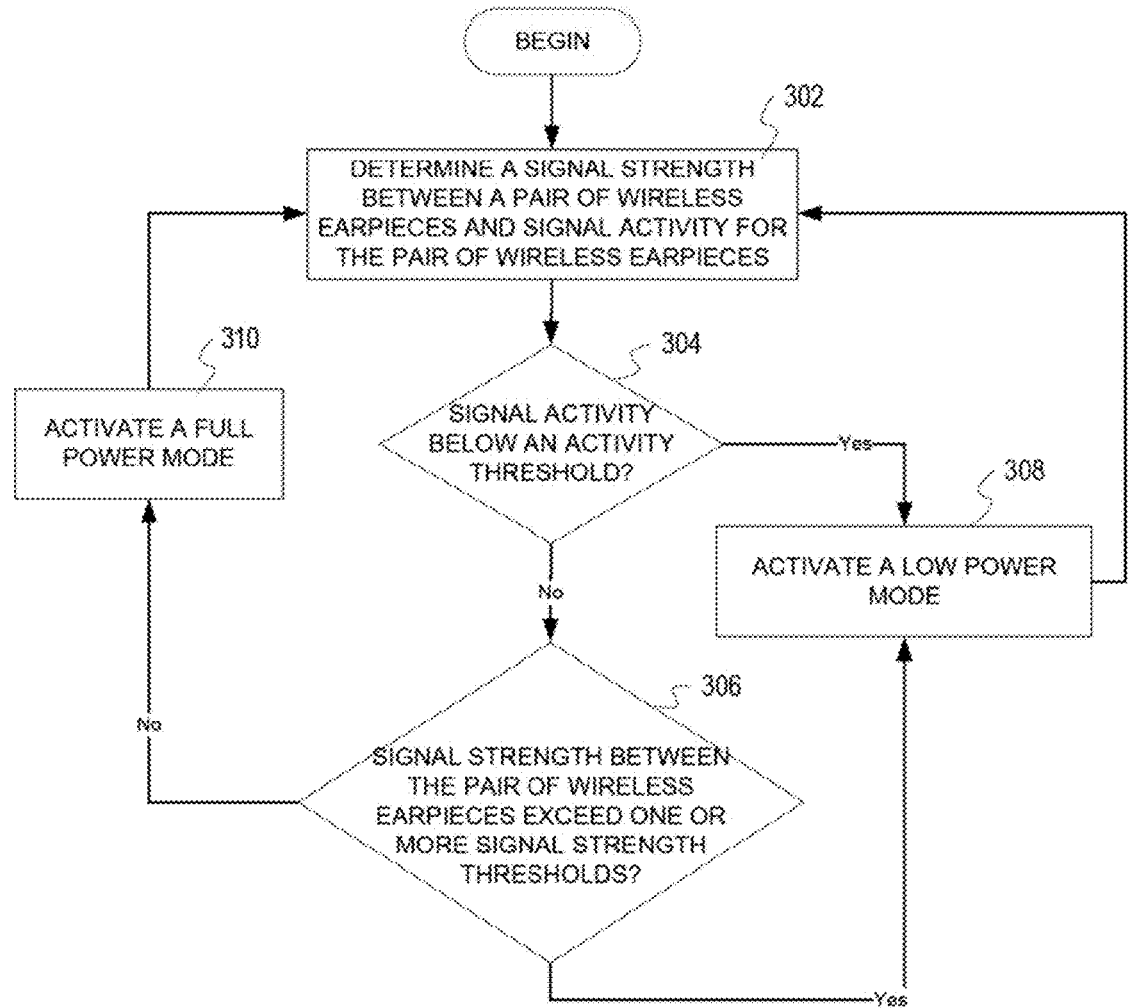
FIG. 3 is a flowchart of a process for managing power utilization of wireless earpieces in accordance with an illustrative embodiment.

FIG. 3 is a flowchart of a process for managing power utilization of wireless earpieces in accordance with an illustrative embodiment. The process of FIG. 3 may be implemented by one or more wireless earpieces individually or collectively, wearable devices, and any number of other devices communicating directly or through a personal area network.

In one embodiment, the process of FIG. 3 may begin by determining a signal strength between a pair of wireless earpieces and signal activity for the pair of wireless earpieces (step 302). The wireless earpieces may be linked with each other (and with other electronic devices) utilizing any number of communications, standards, or protocols. For example, the devices may be linked by a Bluetooth connection. The process may require that the devices be paired utilizing an identifier, such as a passcode, password, serial number, voice identifier, radio frequency, or so forth. In one embodiment, a matched pair of wireless earpieces may be automatically linked for utilization by a single user when manufactured and delivered. The wireless earpieces may be linked with the communications device and any number of other devices directly or through a network, such as a personal area network.

The signal strength may be determined utilizing the amplitude between devices, such as signals received by a left and right wireless earpiece. For example, the relative strength of the signal received between a left and right wireless earpiece may indicate the approximate distance between the devices. The signal strength may also be determined utilizing packets of data that are communicated between the devices. For example, errors or non-receipt of packets may indicate the distance between the devices or a severed connection. The proximity of the devices may be utilized along with a number of thresholds to perform the various determinations.

The signal activity may correspond to processing activity of the wireless earpieces. Status, heartbeat, or default communications utilized by the wireless earpieces are not considered active signal or processing activities. For example, if the wireless earpieces have not received a command from the user or other wireless earpiece, is not performing an operation (e.g., playing music, performing voice communications, tracking biometrics based on a user request, etc.), and is otherwise inactive for a time period, such as one minute, the signal activity may be considered below a signal threshold.

Next, the wireless earpieces determine whether signal activity is below a activity threshold (step 304). The signal activity may be compared against a baseline or threshold level to determine whether significant activities are being performed. In one embodiment, the user may specify activities that indicate significant signal activity that indicate the wireless earpieces are below the threshold.

In response to determining the signal activity is below an activity threshold, the wireless earpieces activate a low power mode (step 308). The low power mode may be activated for one or both of the wireless earpieces. For example, both of the wireless earpieces may enter a low power mode to preserve battery capacity for another time. In another example, the user may opt to only use one wireless earpiece at a time (e.g., left wireless earpiece) out of convenience, to increase battery life, or for any number of other reasons. As a result, the left wireless earpiece may remain in an active mode as utilized and the right wireless earpiece may enter a low power mode. The wireless earpiece(s) may remain in the low power mode until otherwise activated in response to signal activity, signal strength, or other feedback. In one embodiment, the signal activity may remain in the full power mode (step 310) in response determining the signal activity is not below a threshold (e.g., above the threshold). Next, the wireless earpieces may return to determine the signal strength between the pair of wireless earpieces (step 302).

In response to determining the signal activity is not below an activity threshold, the wireless earpieces determine whether signal strength between the pair of wireless earpieces exceed one or more strength thresholds (step 306). The signal strength may indicate the proximity of the wireless earpieces to each other. For example, if the wireless earpieces are too close or too far apart (e.g., determined by signal strength thresholds), the wireless earpieces may activate the low power mode. The wireless earpieces may enter the low power mode because the positioning of the wireless earpieces indicates that the wireless earpieces are not being worn by the user. In another embodiment, the signal strength may also be determined or further clarified utilizing biometric information sensed by the wireless earpieces. For example, if the wireless earpieces do not sense a pulse or touch interface with the ear of the user, the wireless earpieces may activate a low power mode for one or more of the pair of wireless earpieces that do not sense biometric information of the user. The wireless earpieces may also utilize other biometric information determined by the wireless earpieces.

If the wireless earpieces determine the signal strength between the wireless earpieces exceed one or more strength thresholds, the wireless earpieces activate a low power mode (step 308). The low power mode is activated to preserve the battery life because the wireless earpieces are too close or too far apart to be worn by the user.

If the signal strength between the pair of wireless earpieces exceeds one or more signal thresholds, the wireless earpiece activates a full power mode (step 310). If the wireless earpieces are already in a regular, normal, or full power mode, the wireless earpieces remain in the full power mode. If the wireless earpieces have been in a low power mode, the wireless earpieces may engage the various components or circuits and implement the corresponding instructions to enter the full power mode. Next, the wireless earpieces return again to step 302.

The illustrative embodiments provide a system, method, personal area network, and wireless earpieces for managing the power modes or status used by the wireless earpieces individually or collectively. The illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computing system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (e.g., through the Internet using an Internet Service Provider).

Figure 4:
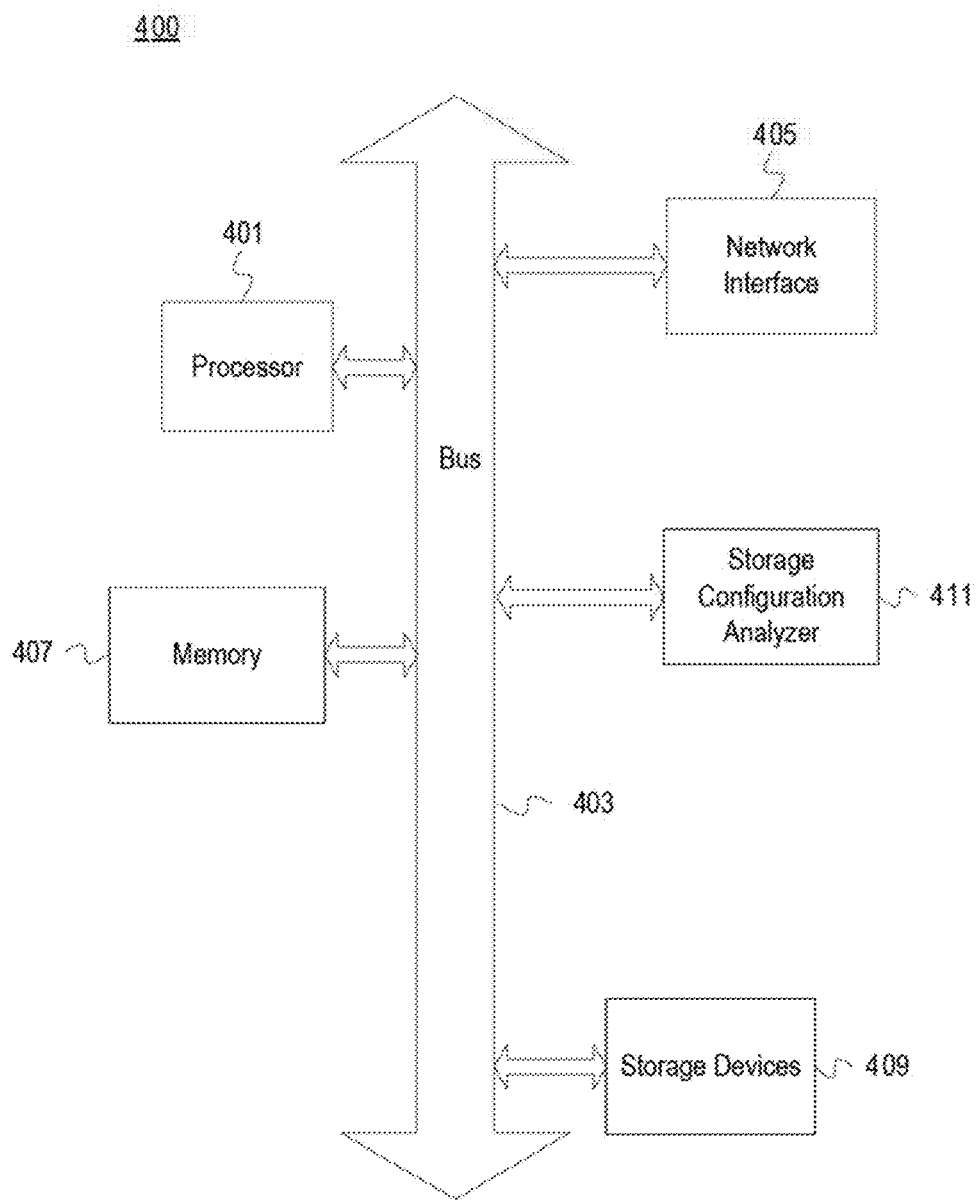
FIG. 4 depicts a computing system in accordance with an illustrative embodiment.

FIG. 4 depicts a computing system 400 in accordance with an illustrative embodiment. For example, the computing system 400 may represent a device, such as the computing device 204 of FIG. 2. The computing device 400 may be utilized to receive user settings, instructions, or feedback for controlling the power management features of the wireless earpieces together and separately. The computing system 400 includes a processor unit 401 (possibly including multiple processors, multiple cores, multiple nodes, and/or implementing multi-threading, etc.). The computing system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM RRAM, SONOS, PRAM, etc.) or any one or more of the above already described possible realizations of machine-readable media. The computing system also includes a bus 403 (e.g., PCI, ISA, PCI-Express, HyperTransport®, InfiniBand®, NuBus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The system memory 407 embodies functionality to implement embodiments described above. The system memory 407 may include one or more functionalities that facilitate retrieval of the audio information associated with an identifier. Code may be implemented in any of the other devices of the computing system 400. Any one of these functionalities may be partially (or entirely) implemented in hardware and/or on the processing unit 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401. A storage configuration analyzer 411 is shown which may be used to analyze storage performance for use in modifying storage configuration.

The features, steps, and components of the illustrative embodiments may be combined in any number of ways and are not limited specifically to those described. In particular, the illustrative embodiments contemplate numerous variations in the smart devices and communications described. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

What is claimed is:

1. A method for managing power utilized by a pair of wireless earpieces for use within ears of a user, comprising:
   receiving biometric information from the user from a plurality of sensors of the pair of wireless earpieces;
   determining a signal strength between the pair of wireless earpieces;
   determining signal activity for the pair of wireless earpieces; and
   activating a low power mode for the pair of wireless earpieces in response to a determination either (1) the signal activity between a first wireless earpiece and a second wireless earpiece or between a wireless device and the first or the second wireless earpiece is below an activity threshold or (2) the signal strength exceeds one or more signal thresholds;
   wherein the one or more signal thresholds are determined utilizing the plurality of sensors of the pair of wireless earpieces to determine whether the first and the second wireless earpieces are being worn by the user.

2. The method of claim 1, wherein the signal strength is determined utilizing an amplitude of a signal between the pair of wireless earpieces.

3. The method of claim 1, wherein the signal activity is associated with communications between the pair of wireless earpieces and processes being performed by the pair of wireless earpieces.

4. The method of claim 3, wherein the processes include at least playing music, performing communications, and tracking biometrics in response to a user request.

5. The method of claim 1, wherein the signal activity is determined in response to communications between the pair of wireless earpieces and one or more external devices.

6. The method of claim 1, wherein the activity threshold and the one or more signal thresholds are configured by a user.

7. The method of claim 1, wherein the one or more signal thresholds indicate the pair of wireless earpieces are not being worn by a user.

8. The method of claim 1, further comprising:
   training the wireless earpieces to determine the one or more signal thresholds.

9. The method of claim 1, further comprising:
   activating a full power mode in response to the signal activity being above a signal threshold.

10. The method of claim 1, further comprising:
    activating a full power mode in response to determining the one or more signal strength thresholds are not exceeded.

11. The method of claim 1, wherein the signal activity is determined for each of the pair of wireless earpieces separately, and wherein each of the wireless earpieces below the activity threshold is placed in the low power mode.

12. The method of claim 1, wherein the signal strength includes a determination of the signal strength between a wireless device in communication with one or more of the pair of wireless earpieces.

13. A pair of wireless earpieces, each earpiece comprising:
    a frame for fitting in an ear of a user;
    a processor controlling functionality of a first wireless earpiece and a second wireless earpiece;
    a plurality of sensors receiving biometric information from the user; and
    a transceiver communicating with at least a wireless device;
    wherein the processor of the first wireless earpiece determines a signal strength between the first wireless earpiece and the second wireless earpiece, determines signal activity indicating whether the first or the second wireless earpieces are performing an operation involving wireless communication, and activates a low power mode for the first and the second wireless earpieces in response to a determination either (1) the signal activity is below an activity threshold, or (2) the signal strength exceeds one or more signal thresholds; and
    wherein the one or more signal thresholds are determined utilizing the plurality of sensors of the pair of wireless earpieces to determine whether the first and the second wireless earpieces are being worn by the user.

14. The pair of wireless earpieces of claim 13, wherein the signal activity is determined for each of the pair of wireless earpieces separately, and wherein each of the wireless earpieces below the activity threshold is placed in the low power mode.

15. The pair of wireless earpieces of claim 13, wherein the signal strength is determined utilizing an amplitude of a signal between the pair of wireless earpieces.

16. The pair of wireless earpieces of claim 13, wherein the signal activity is associated with communications between the pair of wireless earpieces and processes being performed by the pair of wireless earpieces.

17. The pair of wireless earpieces of claim 13, wherein the processor activates a full power mode in (1) response to the signal activity being above a signal threshold, or (2) determining the one or more signal strength thresholds are not exceeded.

18. A first and a second wireless earpiece for use within ears of a user comprising:
  a processor for executing an application;
  a plurality of sensors receiving biometric information from the user;
  a transceiver communicating a wireless signal between the first and second wireless earpiece; and
  a memory for storing the application, wherein the application is executed to:
  determine a signal strength between the first and the second wireless earpieces;
  determine signal activity for the pair of wireless earpieces, wherein the signal activity corresponds to wireless signal activity of the first or the second wireless earpiece in response to performing an operation on the first or the second wireless earpiece; and
  activate a low power mode for the first and the second wireless earpieces in response to a determination either (1) the signal activity is below an activity threshold or (2) the signal strength exceeds one or more signal thresholds;
  wherein the one or more signal thresholds are determined utilizing the plurality of sensors of the pair of wireless earpieces to determine whether the first and the second wireless earpieces are being worn by the user.

19. The first and the second wireless earpieces of claim 18, wherein the signal activity determines whether the first or the second wireless earpiece are being actively utilized by the user to play music, perform communications, receive voice commands from the user, provide guidance and/or perform noise cancellation.

* * * * *